US 8,056,053 B1

(12) United States Patent
Gulley

(10) Patent No.: US 8,056,053 B1
(45) Date of Patent: Nov. 8, 2011

(54) SYSTEM AND METHOD FOR CELL-BASED CODE EDITING AND PUBLISHING

(75) Inventor: Edward Whittington Gulley, Watertown, MA (US)

(73) Assignee: The MathWorks, Inc., Natick, MA (US)

( * ) Notice: Subject to any disclaimer, the term of this patent is extended or adjusted under 35 U.S.C. 154(b) by 977 days.

(21) Appl. No.: 11/881,249

(22) Filed: Jul. 25, 2007

Related U.S. Application Data

(63) Continuation of application No. 11/018,107, filed on Dec. 20, 2004.

(51) Int. Cl.
*G06F 9/44* (2006.01)
(52) U.S. Cl. ......... 717/113; 717/110; 717/139; 717/141
(58) Field of Classification Search .................. 717/113, 717/141, 110, 139
See application file for complete search history.

(56) References Cited

U.S. PATENT DOCUMENTS

| | | | |
|---|---|---|---|
| 5,513,305 A | | 4/1996 | Maghbouleh |
| 5,729,676 A * | | 3/1998 | Inoue .............................. 714/38 |
| 5,956,510 A * | | 9/1999 | Nicholas ...................... 717/137 |
| 6,226,791 B1 * | | 5/2001 | Carter et al. ................... 717/124 |
| 6,311,324 B1 | | 10/2001 | Smith et al. |
| 6,401,087 B2 * | | 6/2002 | Yanagimoto ........................... 1/1 |
| 6,792,595 B1 | | 9/2004 | Storistenau et al. |
| 6,957,366 B1 | | 10/2005 | McDonald |
| 7,069,547 B2 | | 6/2006 | Glaser |
| 7,240,340 B2 * | | 7/2007 | Vaidyanathan et al. ...... 717/143 |
| 7,353,427 B2 | | 4/2008 | Bates et al. |
| 7,496,906 B2 | | 2/2009 | Black-Ziegelbein et al. |
| 7,526,753 B2 | | 4/2009 | Spencer et al. |
| 7,536,682 B2 * | | 5/2009 | Dankel et al. ................. 717/139 |
| 7,765,532 B2 * | | 7/2010 | Dutt et al. ..................... 717/149 |
| 2003/0023961 A1 * | | 1/2003 | Barsness et al. .............. 717/152 |
| 2003/0093720 A1 * | | 5/2003 | Miyao et al. .................... 714/38 |
| 2004/0221278 A1 * | | 11/2004 | Dankel et al. ................. 717/139 |
| 2005/0028107 A1 | | 2/2005 | Gomes et al. |
| 2005/0210416 A1 | | 9/2005 | MacLaurin et al. |

OTHER PUBLICATIONS

Ryder et al. "Change Impact Analysis for Object-Oriented Programs" 2001, ACM.*
Larus et al. "Machine-Independent Executable Editing" 1995.*

* cited by examiner

*Primary Examiner* — Ted T Vo
*Assistant Examiner* — Phillip Nguyen
(74) *Attorney, Agent, or Firm* — Nelson Mullins Riley & Scarborough LLP

(57) ABSTRACT

A code cell is selected from a program code. The code cell is a contiguous subsection of code. To select the code cell from the program code, a first indicator is placed in the program code prior to the beginning of the code cell and a second indicator is placed in the program code after the end of the code cell. The code cell is edited to obtain an edited code cell. The edited code cell is analyzed, without saving the program code, to produce a result. The result is provided.

22 Claims, 7 Drawing Sheets

Fig. 9

SYSTEM AND METHOD FOR CELL-BASED CODE EDITING AND PUBLISHING

CROSS-REFERENCE TO RELATED PATENT APPLICATION

This application is a continuation of U.S. patent application Ser. No. 11/018,107, by Gulley, filed Dec. 20, 2004, entitled "System and Method for Cell-Based Code Editing and Publishing," the subject matter of which application is being incorporated herein by reference in its entirety.

FIELD OF THE INVENTION

The illustrative embodiment of the present invention relates generally to interactive development of program code and more particularly to cell-based code editing.

BACKGROUND

Program development is an iterative process engaged in by a program developer in a program development environment. The process of creating executable code requires a significant amount of time on the part of the developer in running different versions of the code. The developer will frequently add or subtract different lines of code and or alter values for variables in the code in an effort to reach a desired result or optimize the execution of a piece of code. For developers in an interpreted language development environment, this editing and execution process will frequently take place either from a command line or from an editor. An interpreted language environment executes code line by line with an interpreter without first compiling the entirety of the code. The command line in an interpreted language development environment allows a line by line execution of the code and may allow the code to be resolved to a small number of commands appearing in a command window. The editor groups many lines of code together for the program developer to access and alter as needed.

Unfortunately, both the command line and the editor have drawbacks for developers in an interpreted program development environment. With the command line, output appears in place, but there is no line-by-line grouping. As a result, the scope of the code is difficult to track. With the editor, many lines may be grouped together, but the developer/user is required to name and save the file each time prior to attempting to execute the code so that it can be analyzed. This requires the developer's mental effort and also generates large amounts of unwanted data on the system from leftover code versions.

BRIEF SUMMARY

In one exemplary embodiment, a code cell is selected from a program code. The code cell is a contiguous subsection of code. To select the code cell from the program code, a first indicator is placed in the program code prior to the beginning of the code cell and a second indicator is placed in the program code after the end of the code cell. The code cell is edited to obtain an edited code cell. The edited code cell is analyzed, without saving the program code, to produce a result. The result is provided.

One exemplary embodiment provides a system for interactive editing. A computer-readable medium includes a program code. A display displays the program code. A processor detects an input by a user selecting a contiguous subsection of the program code as a code cell, detects an edit to the code cell, and analyzes the code cell without storing the program code to the computer-readable medium, to produce a result.

BRIEF DESCRIPTION OF THE DRAWINGS

These and other aspects of this invention will be readily apparent from the detailed description below and the appended drawings, which are meant to illustrate and not to limit the invention, and in which:

FIG. 9 depicts the correspondence between marked up program code and documents published in a format selected by a user.

DETAILED DESCRIPTION

Interactive coding allows a user to focus on a solution by repeatedly modifying instructions and/or altering values in the program code, followed by the re-running of the computer code. The cell-based code editing enabled by the present invention improves the speed of interactive coding by allowing the interactive process to be run without saving code every time instructions are altered, a process known as rapid prototyping, and by allowing the in-place modification of code values. Once the program code has been optimized, the code in the selected cells may be marked-up and published to a particular format in response to a single command.

Figure 1:
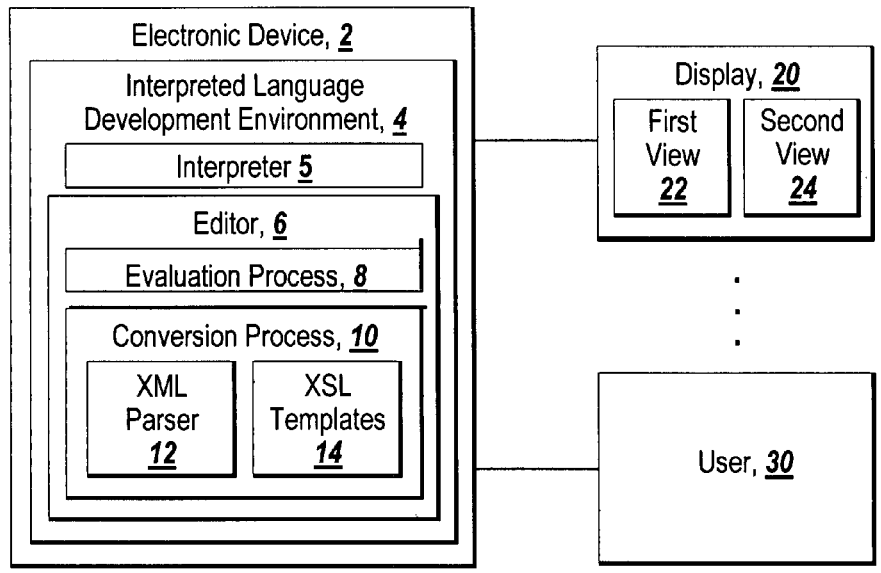
FIG. 1 depicts a block diagram of an environment suitable for practicing the illustrative embodiment of the present invention.

FIG. 1 depicts a block diagram of an environment suitable for practicing the illustrative embodiment of the present invention. An electronic device 2 includes an interpreted language development environment 4. The electronic device 2 may be a server, laptop, workstation, client device, PDA or some other type of electronic device equipped with a processor and capable of supporting the interpreted language development environment 4. An exemplary interpreted language development environment 4 is MATLAB from The MathWorks of Natick, Mass. The interpreted language development environment 4 includes an interpreter 5 and an editor 6. The editor 6 includes an evaluation process 8, and a conversion process 10. As set forth in further detail below, when triggered from the editing environment, the evaluation process 8 is able to evaluate selected code in the editor without first saving the code to a separate file. The conversion process 10 utilizes an XML parser 12 and XSL (eXtensible Stylesheet Language) templates 14. The XML parser 12 is used to parse saved code into a document object model. The XSL templates 14 are used to convert the document object model into documents of a user-specified format.

As depicted herein, the evaluation process is built into an editor such as the editor in MATLAB. The evaluation process in the built-in editor may be triggered by the user as set forth in further detail below. It will be appreciated that other implementations of the present invention may utilize a standalone evaluation process communicating with the other components described herein.

The electronic device 2 is in communication with a display 20. The display 20 includes a first view 22 and a second view 24 generated by the interpreted language development environment 4. The first view 22 is utilized by the illustrative embodiment of the present invention to display a collection of program code selected by a user 30 to the user. The second view 24 is used by the illustrative embodiment of the present invention to display the results of evaluation of a code cell and/or a published document based on the code cell, to the user 30 in the manner set forth below. The second view may be textual, as in the case of program text output to the command line, or it may be graphical, as in the plot of curve defined by a variable, or it may be both textual and graphical. The second view may also include audio output resulting from the evaluation of code. When the second view displays a published document the first view (code input) and the second view (code output) are joined into a single and unified published and documented view.

Those skilled in the art will recognize that the combination of elements depicted in the environment of FIG. 1 is shown in an illustrative sense and not as a limiting depiction. For example, the user 30 may be remotely located from the electronic device 2 over a network. Similarly, the conversion process 10 may be located in the interpreted language development environment 4 but not be contained within the editor 6. Likewise, the interpreted language development environment 4 may generate one or three or more views to display output to the user rather than the two views shown in FIG. 1. These and other implementations are within the scope of the present invention.

Figure 2:
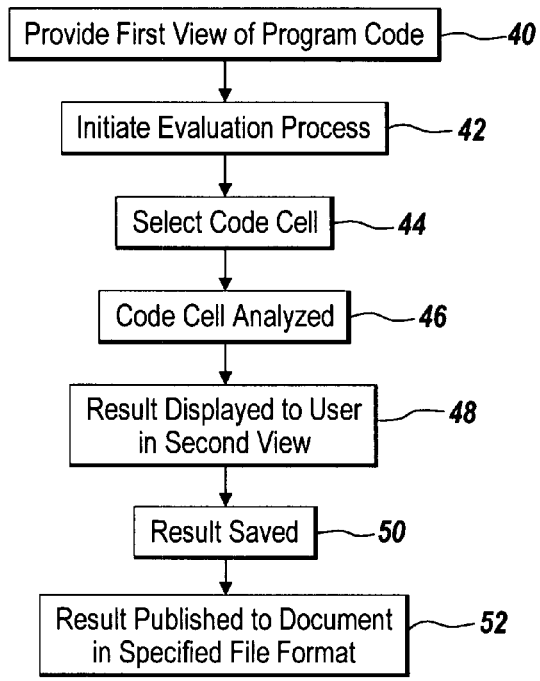
FIG. 2 is a flowchart of the sequence of steps followed by the illustrative embodiment of the present invention to analyze a selected code cell.

The illustrative embodiment of the present invention allows the rapid prototyping of code selected by a user without resorting to saving the code subsections between each evaluation iteration. FIG. 2 is the sequence of steps followed by the illustrative embodiment of the present invention to perform rapid prototyping of selected code cells and the subsequent rapid conversion of selected code to a user-selected format. The sequence begins with providing of a first view containing program code to the user (step 40). A user initiates an evaluation process 8 by selecting a control within the first view 22 which triggers the rapid prototyping mode (step 42). The user then selects a code cell from among the lines of contiguous program code displayed in the first view (step 44). The code cell may be comprised of one or more contiguous lines of code. Code within the cell will be interpreted. The evaluation process 8 then analyzes the selected code cells (step 46) and the results of the analysis are displayed to the user in the second view 24 (step 48). Unlike conventional editors, the illustrative embodiment of the present invention allows the rapid prototyping of program code without first saving the program code to a separate file. The rapid prototyping may be continued indefinitely until the user is satisfied with the result. Once the program code has been determined by the user to be acceptable, the user may then save the result (step 50). The saved results may then be published in a document in a specified file format selected by the user (step 52). The conversion process by which the saved code is converted into the selected document format is discussed further below.

Figure 3:
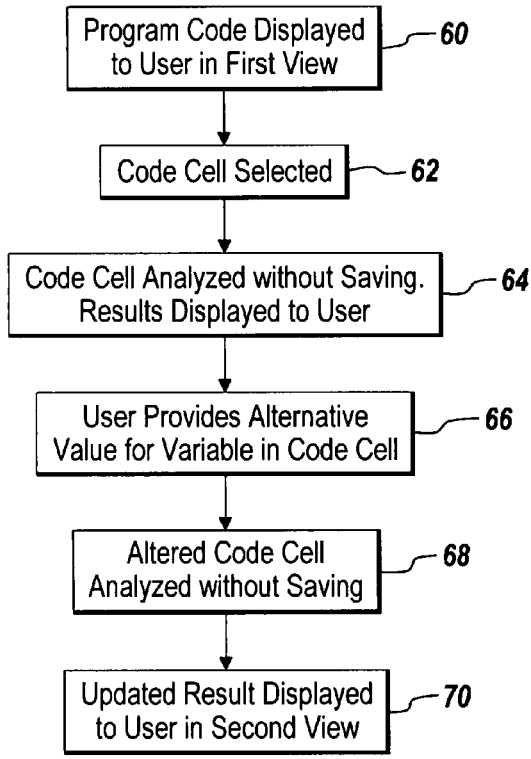
FIG. 3 is a flowchart of the sequence of steps followed by the illustrative embodiment of the present invention to analyze a selected code cell containing an updated value.

Interactive coding requires frequent iteration of code segments until optimized code is achieved. The illustrative embodiment of the present invention provides the ability to streamline the editing of values in the program code by allowing for in-place modification of values prior to analysis. FIG. 3 depicts the sequence of steps followed by the illustrative embodiment of the present invention to provide an in-place modification of a variable value in the program code prior to evaluating the code cell. The sequence begins when the program code is displayed to the user in the first view by the editor 6 (step 60). Upon entering the rapid prototyping mode following the user selection of the mode, a code cell is selected by the user from among the lines of contiguous code (step 62). It should be noted that in circumstances where the user does not affirmatively indicate a code cell division in the first view, the illustrative embodiment of the present invention may still evaluate the entire displayed code as a single cell. Following the selection of the code cell, the code cell is analyzed without first saving the code to the separate file and the results are then displayed to the user (step 64). Upon viewing the results, the user may decide the results are suboptimal and desire an analysis of a different version of the code cell. The illustrative embodiment of the present invention allows a user to provide alternative values for variables in the code cell in a number of ways including in-place modification (step 66). In one aspect of the present invention, the user may select a value variable in the program code being displayed and by utilizing tool bar controls, enter a new value without having to re-type the code. In one implementation of the present invention, a single click on the toolbar or +key can increment a variable and evaluate the cell. Exemplary tool bar controls allowing in-place modification of the code values are discussed further below. Once the variable value has been altered the code cell may be analyzed again without saving (step 68). The updated result is then displayed to the user in a second view (step 70). Those skilled in the art will recognize that the in-place or other modification of the values may be continued until such time that the user is satisfied with the results or decides not to enter additional values.

Figure 4:
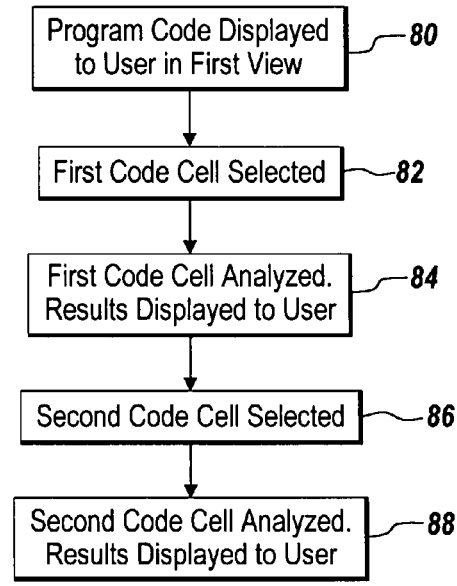
FIG. 4 is a flowchart of the sequence of steps followed by the illustrative embodiment of the present invention to analyze a second selected code cell.

The present invention also supports the sequential analysis of multiple code cells selected by a user. FIG. 4 depicts the sequence of steps followed by the illustrative embodiment of the present invention for a user to select multiple code cells. The sequence begins when the program code is displayed to the user in the first view (step 80). The user selects the first code cell (step 82) and may select a second code cell from the program code displayed to the user in the first view (step 84). The first code cell is then analyzed with the end results displayed to the user (step 86). Subsequently, the second code cell is analyzed in the same manner, and the results displayed to the user (step 88). Since each code cell may be individually saved following the evaluation and then converted into a document of a type specified by the user, the ability to select multiple code cells from the program code displayed in the first view enables the user to convert accepted saved versions of the code cells into published documents showing a narrative effect of the running of the code. The use of the multiple code cells to display sequential views of the code analysis is discussed further below.

The second view 24 is utilized to display results to a user 30. As noted above, the second view 24 being displayed to the user 30 may render the textual, graphical or audio results of a code cell being executed. Alternatively, the second view may display a published document to the user 30. For example when evaluating a cell with a statement "a=3+4", the result appears in the second view (such as the MATLAB command window) as "a=7". Similarly, a graphical result could be displayed showing the result of the calculation. The second view 24 may also be used to display a published view to the user with both the input "a=3+4" and the output "a=7" being joined in a static document such as an HTML document. Those skilled in the art will recognize that both a view of the output of the execution and a published view may be displayed to a user at the same time by displaying a third view without departing from the scope of the present invention.

Figure 5:
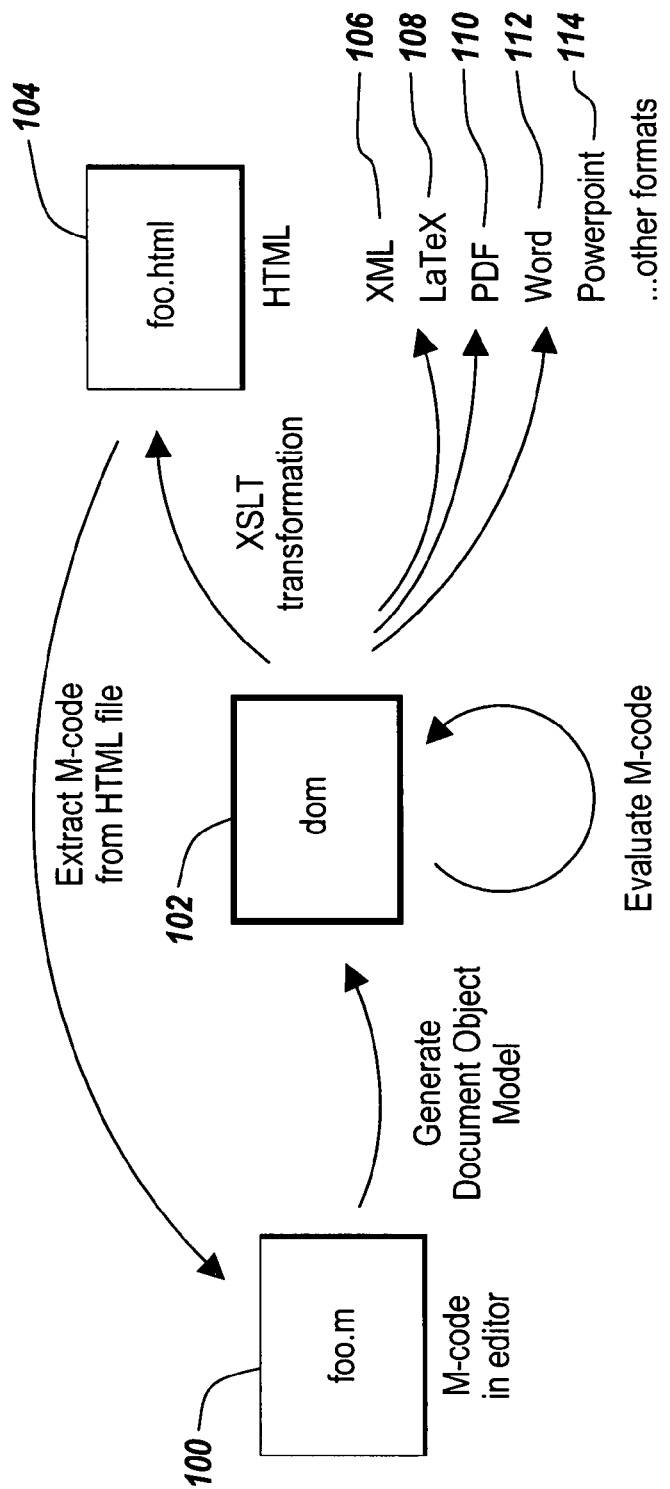
FIG. 5 is a block diagram representation of the conversion process engaged in by the illustrative embodiment of the present invention to publish code in a user-selected format.

FIG. 5 is a block diagram of the XML-based architecture utilized by the illustrative embodiment of the present invention to convert program code to a published document in a format selected by a user. Following the evaluation process discussed above, the program code is saved to a file such as an .m file in MATLAB. The saved .m file, foo.m 100 in FIG. 5, is used as the basis of a document object model 102. An XML parser is used to section the code for the document object model. By way of toolbar controls or menu commands, the user is able to select a desired format and convert the document object model into a published document of a single format with a single click. For example, the user may choose to convert the code to a published foo.html 104 document displayed to the user on the second view.

Alternatively, the user may choose to publish an XML document 106, a LaTeX document 108, a PDF document 110, a WORD document 112, a POWERPOINT document 114 or some other type of document. XSL templates are used to transform the document object model 102 into the user-selected format. With POWERPOINT documents, each code cell is displayed as a separate slide. A slideshow of the published slide allows a user to view the sequential execution of each code cell thus presenting a narrative effect. The illustrative embodiment of the present invention also allows M-code to be extracted from a published HTML file and converted and imported back to the M-code editor.

Figure 6:
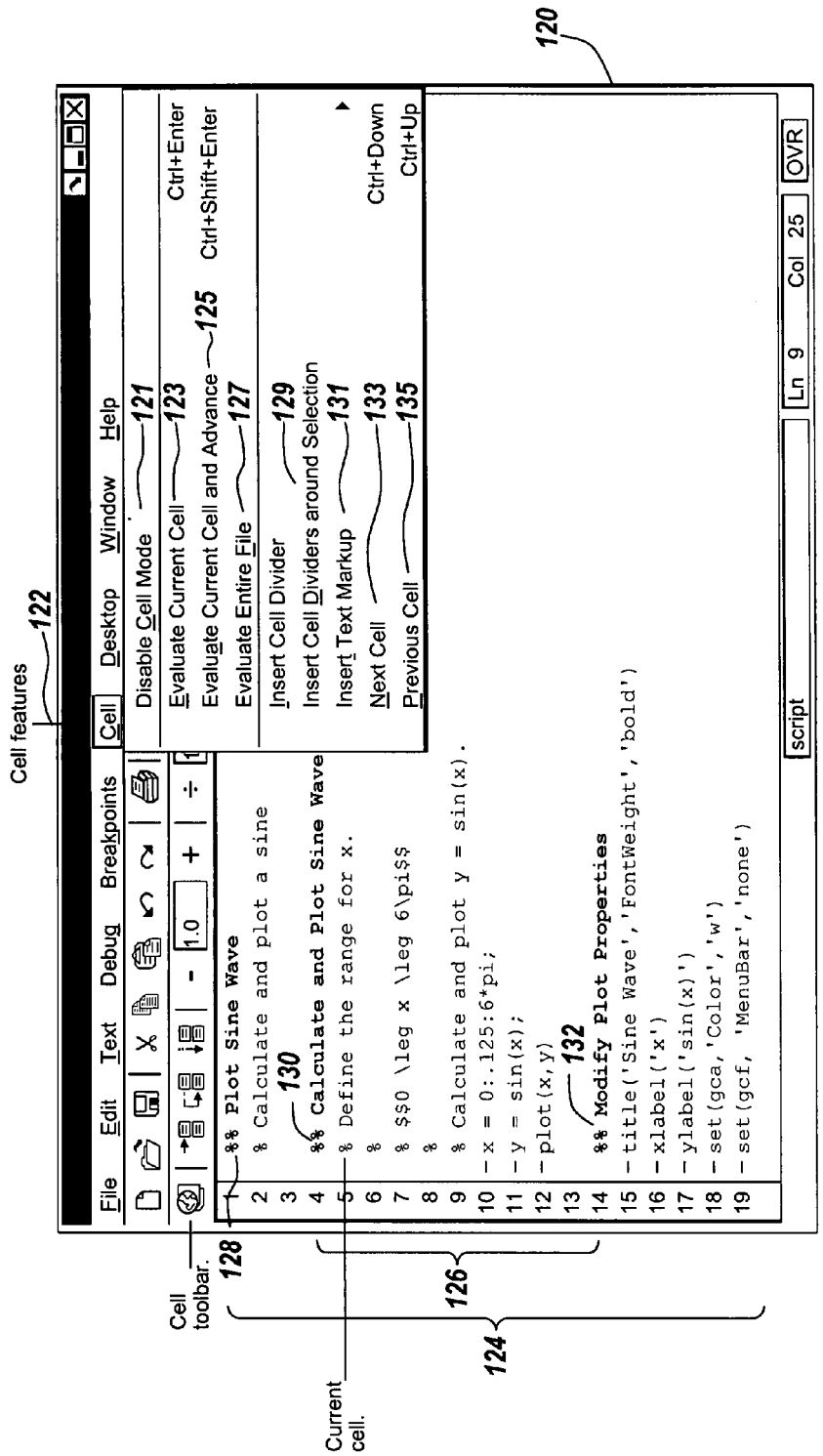
FIG. 6 is a representation of a GUI suitable for use in the illustrative embodiment of the present invention indicating operations available to be performed on the code cell.

FIG. 6 depicts a screen shot of a user interface suitable for the first view used by the illustrative embodiment of the present invention to display program code to the user. The window 120 includes a cell pull-down menu 122 which displays various code cells operations available once the user has initiated cell mode. For example, the code cell menu may include a menu command to disable cell-mode 121. Such a command would convert the editor back into normal editing mode. The code cell menu may also include a command to evaluate the current cell 123 or evaluate the current cell and advance to the next cell 125. Similarly, the code cell menu 122 may include a command to evaluate the entire file 127. The code cell menu 122 additionally includes a command to insert a cell divider 129 marking either the beginning or ending of a code cell. The command inserts two percentage signs at an indicated point in the code. It will be appreciated that a user may also manually type the two percentage signs directly into the code to mark a cell boundary. Commands are also available allowing the user to insert text markup 131, change the active cell to the next cell 133, or change the active cell to the previous cell 135.

The user initiates cell editing mode by clicking an icon 128 on a cell tool that provides various operations that may be selected by the user during code cell mode. Those skilled in the art will recognize that other options to initiate cell mode may also be provided to a user such as a menu command. The window 120 displays the collection of program code 124. Within the displayed program code are the code cell indicators 128, 130 and 132 marking the borders of the code cells selected by the user. The code cell dividers may be marked using double percentage signs such as those indicated in FIG. 6. It will be recognized by those skilled in the art that the actual form of the indicator is an implementation choice and may vary without departing from the scope of the current invention. A current code cell, such as code cell 126 may be marked with an indicator such as by highlighting the cell to demonstrate to the user that the cell that is currently active.

Figures 7A, 7B, 7C:
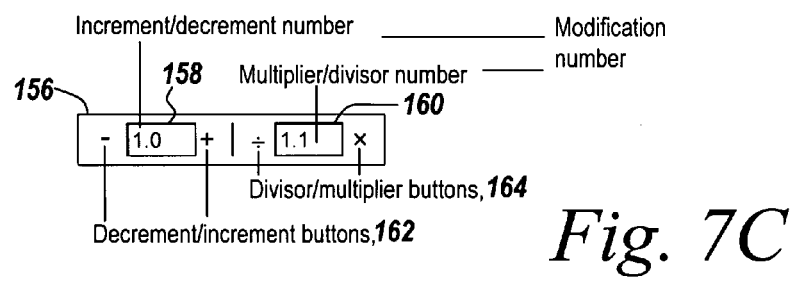
FIG. 7A is a GUI suitable for use in the present invention showing a collection of program code being displayed to a user prior to the selection of a code cell.
FIG. 7B is a GUI suitable for use in the present invention showing a collection of program code being displayed to a user after the selection of a code cell.
FIG. 7C is a block diagram of a control in the GUI of FIGS. 7A and 7B which is used to alter variables in a selected code cell in the illustrative embodiment of the present invention.

FIGS. 7A, 7B and 7C depict the changing views of the illustrative embodiment of the present invention during the performance of rapid prototyping of code. FIG. 7A depicts the first view window 140 displaying the program code viewed by the user 142. FIG. 7B includes the first view window 150 displaying the program code of FIG. 7A which has now been subdivided by the user placing code cell indicators 152 and 154. The code cell indicators, double percentage signs, indicate the formation of two code cells 152 and 154. The program code includes a plot function 151 which is discussed further below. The window 150 also includes a tool bar control 156 allowing for in-place modification of variable values displayed in the program code.

The tool bar control 156 is depicted further in FIG. 7C. The tool bar control 156 includes a window 158 for incrementing and decrementing a selected value. The incrementing and decrementing for the window 158 may be performed via the user manipulating decrement and increment buttons 162 which causes the selected value in the code to increment/decrement by the displayed amount. The tool bar control 156 also includes a window 160 allowing a user to modify a multiplier or divisor number for depicted value. Similarly to the increment and decrement function, the divisor/multiplier buttons 164 may be used to modify the multiplier/divisor number for a selected value rather than the user directly typing a value into the window. Those skilled in the art will recognize that other mechanisms may be used for in-place modification of code values. For example, a selected code value may be changed using the plus and minus keys on the keyboard or the manipulation of a mouse wheel.

Figure 8:
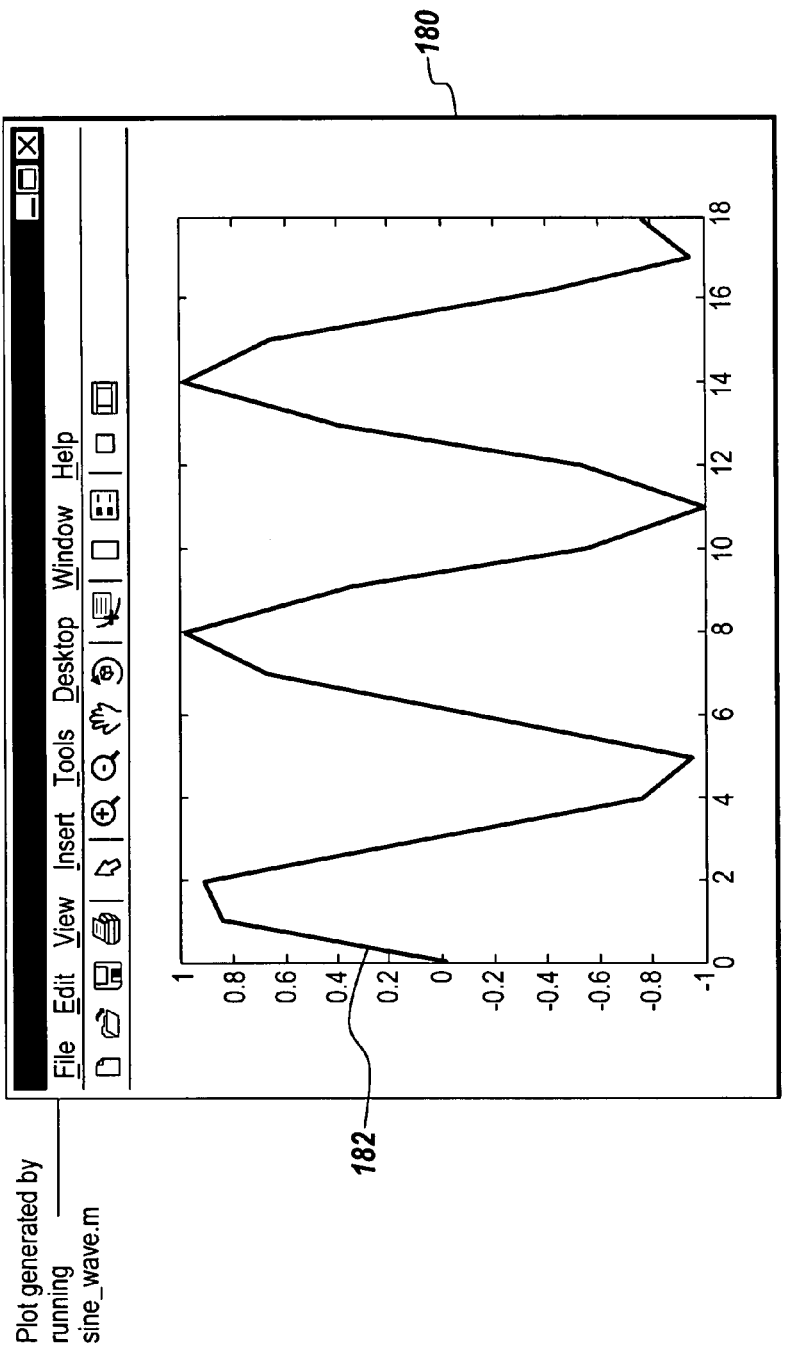
FIG. 8 is a plot of a sine wave generated by evaluating a selected code cell.

The plot function 151 depicted in window 150 of FIG. 7B creates an output when the evaluation process evaluates the selected code cell. The output from the plot function, a sine wave, is displayed to the user in a second window 180 depicted in FIG. 8. The results of the plot function are displayed to the user using a graph 182.

Figure 9:
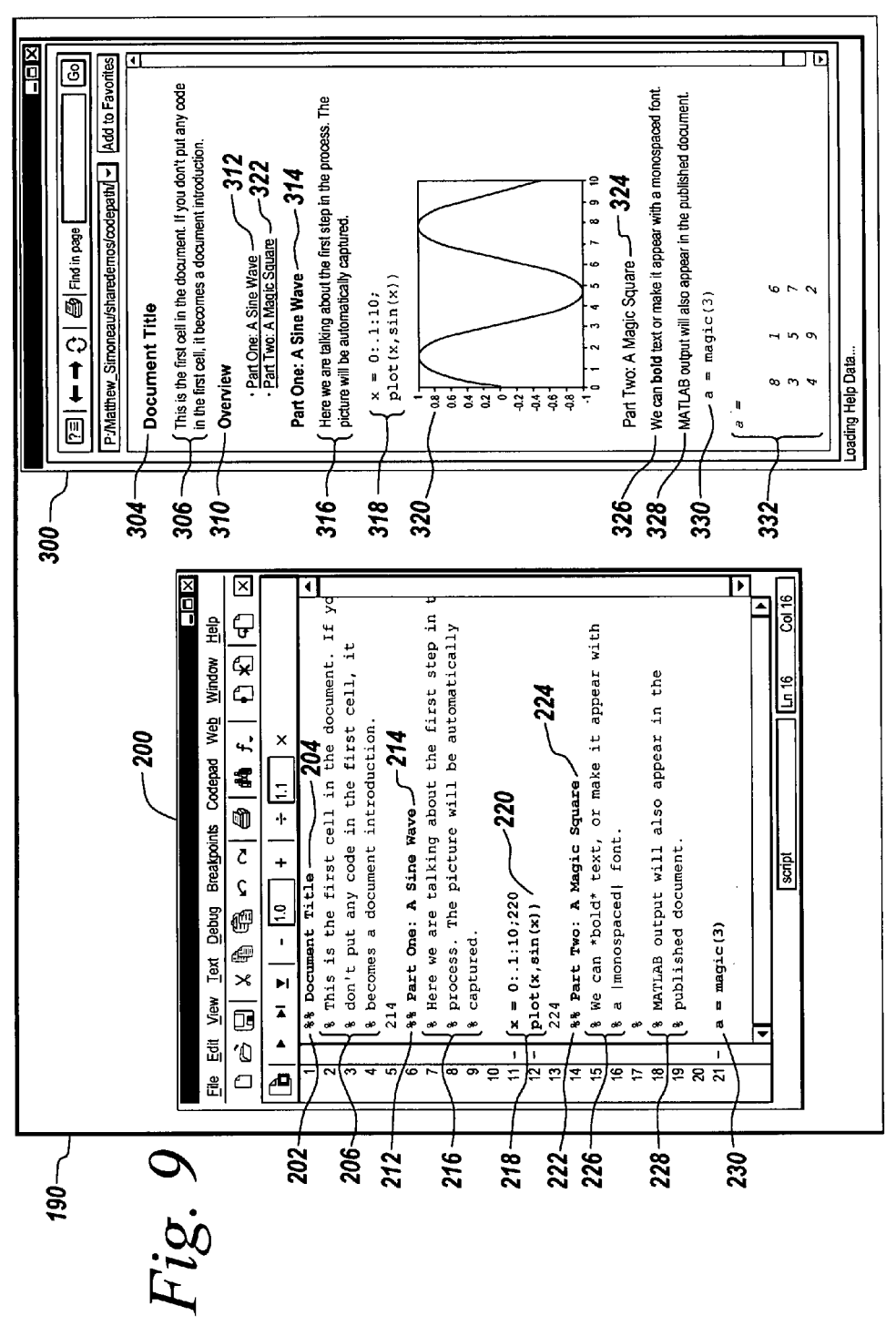

As mentioned above, once the user has adjusted the code to an optimal point, the code may be saved and used to generate a published document in a user-selected format. The elements of the code in the first view are utilized to produce the published document displayed to the viewer in a second view. FIG. 9 shows a depiction of the correspondence between the program code which undergoes rapid prototyping by user using the methods of the present invention and a published document which converts the saved code to a user selected format. A display 190 includes a first view window 200 and second view window 300. The first view window 200 displays the program code and multiple cell indicators 202, 212, and 222 added by the user. The code cell section indicators, 202, 212, and 222 are all followed by spaces and then section labels 204, 214, and 224.

An HTML representation of the evaluated program code is shown in the second view window 300. Elements of the window 200 correspond to elements depicted in the window 300. Thus the code section labels 204, 214, and 224 are reflected in the window 300 as headers 304, 314, and 324. Similarly the comments in the first view 206, 216, 226, and 228 (denoted by a single percentage sign which causes the text not to be interpreted during evaluation) are reflected in window 300 as text 306, 316, 326 and 328. Program code 218 from the code section is reflected as code 318 in window 300. Additionally, the output from the code 218, specifically the output from running the plot command 220, is depicted in the graph 320 showing the sine wave in window 300. The illustrative embodiment of the present invention also allows command line output to be captured. Thus the code a=magic (3) (230) depicted in window 200 is displayed as command 330 and output matrix 332 in the window 300.

In one aspect of the present invention, a published document may automatically be saved to a networked electronic repository. Users may select code directly from the networked electronic repository and put it immediately into the first view for use with cell-based editing and publishing, thereby enabling roundtrip publishing and subscribing from a coding session to a shared network code repository. In one implementation, a user navigates to a web page with published code on it and clicks on a link, thereby making the code available for editing from within the editor of the present invention, edits the selected code and clicks on a button to republish the result back to the web.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. A computing device-implemented method of interactive editing, comprising:
    receiving a selection, the selection indicating a code cell in a program code, the code cell including a contiguous subsection of code, the selecting of the code cell in the program code including:
        receiving a first indicator in the program code prior to a beginning of the code cell, and
        receiving a second indicator in the program code after an end of the code cell;
    receiving an edit to the code cell, the edit producing an edited code cell, the edited code cell including a value for a variable;
    interpreting, in an editing environment, the code in the edited code cell with an interpreter without first saving the program code, the interpreting producing a first result;
    displaying the first result;
    performing in-place editing of the value for the variable in the edited code cell to produce an altered code cell, the in-place editing performed after the displaying of the first result;
    interpreting, in the editing environment, the code in the altered code cell with the interpreter without first saving the program code, the interpreting producing an altered result; and
    displaying the altered result.

2. The method of claim 1, wherein the selection of the code cell in the program code further comprises:
    placing the second indicator in the program code after the end of the code cell, wherein the beginning of the code cell is the beginning of the program code.

3. The method of claim 1, wherein the second indicator is also the beginning of a second code cell and the end of the program code is the end of the second code cell.

4. The method of claim 1, wherein the beginning of the program code is the beginning of the code cell and the end of the program code is the end of the code cell.

5. The method of claim 1, wherein the selection of the code cell in the program code further comprises:
    accessing a page on the world wide web, the page including the program code;
    selecting a link on the page to the program code;
    opening the program code from the selected link in a program editor;
    editing the program code in the program editor; and
    after providing the first or second result, republishing the edited program code to the page on the world wide web.

6. A non-transitory computer-readable medium holding computer-executable instructions for performing interactive editing, the instructions when executed causing at least one computing device to:
    receive a selection of a contiguous subsection of a program code, the receiving of the selection of a contiguous subsection of a program code including:
        receiving a first indicator at a beginning of the contiguous subsection of program code, and
        receiving a second indicator at an end of the contiguous subsection of program code, the contiguous subsection of code between the beginning and end forming a code cell;
    receive an edit to the contiguous subsection of the program code, the edit producing an edited code cell, the edited code cell including a value for a variable;
    interpret, in an editing environment, the code in the edited code cell with an interpreter without first saving the program code, the interpreting producing a first result;
    display the first result;
    perform in-place editing of the value for the variable in the edited code cell to produce an altered code cell, the in-place editing performed after the display of the first result;
    interpret, in the editing environment, the code in the altered code cell with the interpreter without first saving the program code, the interpreting producing an altered result; and
    display the altered result.

7. The computer-readable medium of claim 6, wherein the first or altered results are published in a results document.

8. The computer-readable medium of claim 7, wherein the results document is transmitted over a network for display.

9. The computer-readable medium of claim 6, wherein the edit to the contiguous subsection of the program code is made by a user.

10. A system for interactive editing, comprising:
    means for receiving a selection, the selection indicating a code cell in a program code, the code cell including a contiguous subsection of code, the selecting of the code cell in the program code including:
        receiving a first indicator in the program code prior to a beginning of the code cell, and
        receiving a second indicator in the program code after an end of the code cell;
    means for receiving an edit to the code cell, the edit producing an edited code cell, the edited code cell including a value for a variable;
    means for interpreting, in an editing environment, the code in the edited code cell with an interpreter without first saving the program code, the interpreting producing a first result;

means for displaying the first result;

means for performing in-place editing of the value for the variable in the edited code cell to produce an altered code cell, the in-place editing performed after the display of the first result;

means for interpreting, in the editing environment, the code in the altered code cell with the interpreter without first saving the program code, the interpreting producing an altered result; and means for displaying the altered result.

11. The system of claim 10, wherein an input selecting the contiguous subsection of the program code is generated by a user.

12. The system of claim 10, further comprising:

means for publishing the first or altered result to a results document with a specified file format.

13. The system of claim 12, further comprising:

means for transmitting the results document; and means for receiving the results documents and storing the results document.

14. The system of claim 13 wherein the results document is received automatically when the results document is published.

15. The system of claim 12, further comprising:

means for receiving a selection of a networked electronic repository to which the results document is transmitted.

16. A system for interactive editing, comprising a processor configured to:

detect an input by a user selecting a contiguous subsection of the program code as a code cell, detect an edit to the code cell, the edit resulting in an edited code cell, the edited code cell including a value for a variable, interpret, in an editing environment, the code in the edited code cell with an interpreter without first saving the program code, the interpreting producing a first result, generate a display of the first result via a display device, perform in-place editing of the value for the variable in the edited code cell to produce an altered code cell, the in-place editing performed after the display of the first result;

interpret, in the editing environment, the code in the altered code cell with the interpreter without first saving the program code, the interpreting producing an altered result; and the display device, the display device displaying the altered result to a user.

17. The system of claim 16, wherein the processor is further configured to:

publish the first or altered result to a results document with a specified file format.

18. The system of claim 16, further comprising:

a communications interface to transmit a results document; and a networked electronic repository to receive and store the results document.

19. The system of claim 18, wherein the networked electronic repository further receives the results document automatically when the results document is published by the processor.

20. The method of claim 1 wherein the in-place editing is performed via a tool bar control.

21. The medium of claim 6 wherein the in-place editing is performed via a tool bar control.

22. The system of claim 16 wherein the in-place editing is performed via a tool bar control.

* * * * *